J. B. FOOTE.
APPARATUS FOR REMOVING STEMS FROM FRESH FRUIT.
APPLICATION FILED MAR. 16, 1914.
1,234,697.
Patented July 24, 1917.
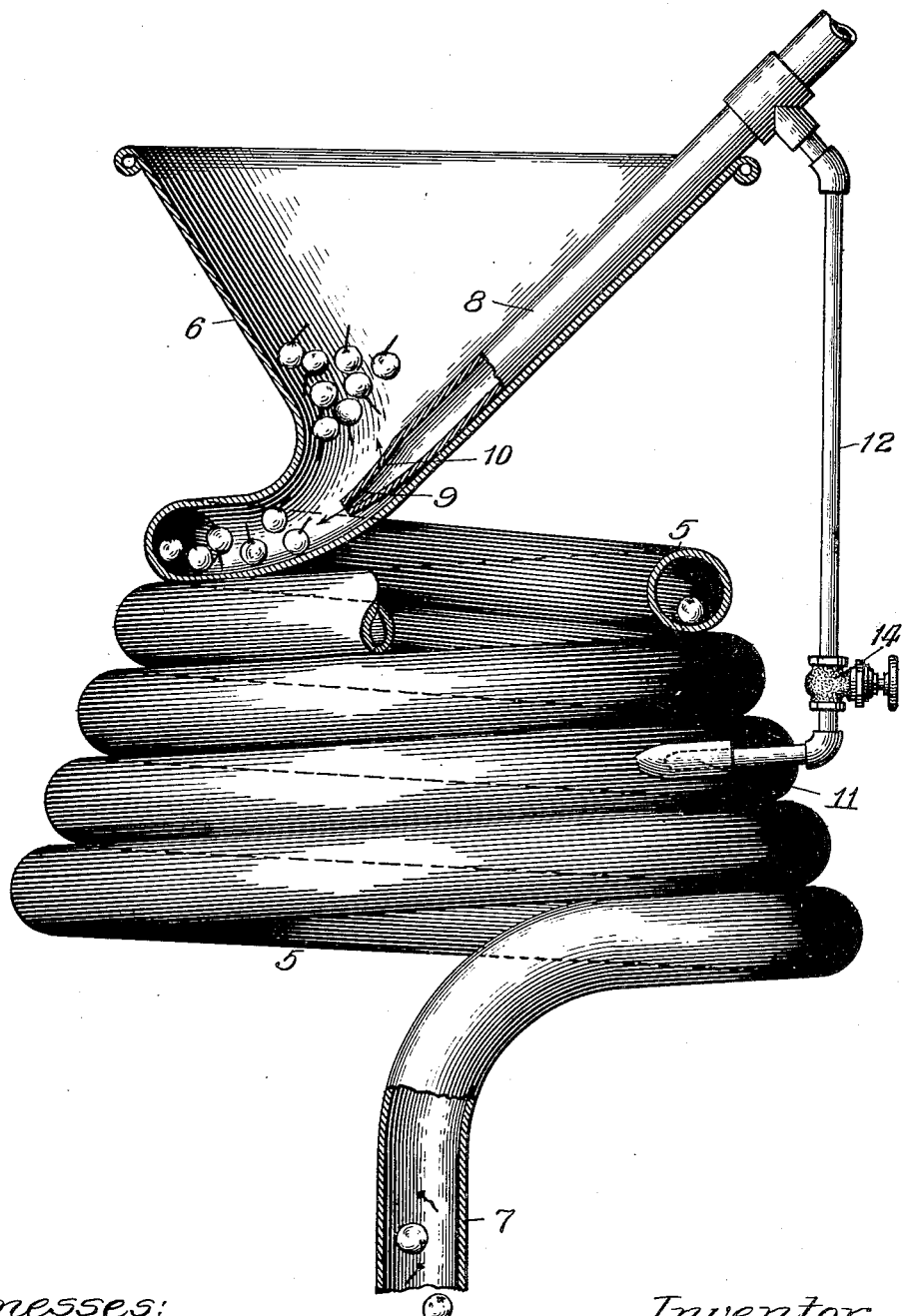

UNITED STATES PATENT OFFICE.

JOHN B. FOOTE, OF OAK PARK, ILLINOIS.

APPARATUS FOR REMOVING STEMS FROM FRESH FRUIT.

1,234,697.  Specification of Letters Patent.  Patented July 24, 1917.

Application filed March 16, 1914. Serial No. 824,860.

*To all whom it may concern:*

Be it known that I, JOHN B. FOOTE, a resident of Oak Park, in the county of Cook and State of Illinoiis, have invented certain new and useful Improvements in Apparatus for Removing Stems from Fresh Fruit, of which the following is a full, clear, and exact description.

The invention relates to apparatus for stemming cherries.

It has heretofore been proposed to remove the stems from fresh cherries by gripping devices adapted to pull the stems from the cherries. It has been found that these devices do not operate to efficiently stem all of the cherries because of the difficulty in definitely bringing the stems of the cherries into the bite of the gripping devices, and the difficulty in particularly positioning a cherry so the stems will be gripped, and resultantly the machine would not remove the stems from a large percentage or substantially all of the fruit supplied to the machine.

The present invention designs to provide an improved method and apparatus for stemming cherries, in which removal of the stems by gripping and pulling will be avoided. This object is attained by providing a method and apparatus in which the cherries are forcibly moved or rotated irregularly without exerting sufficient pressure upon them to crush the fruit, so that the stems will be flexed or encounter a surface and be whipped from the fruit in their rotation. In other words, the cherries are manipulated so that their stems will strike some surface in their path as they are forced through the runway, and be flexed and separated from the body of the fruit.

In practice, it has been discovered that the stems of cherries may be removed by the movement or rolling of the cherry on or along a surface, which produces a sort of a whipping or striking of the stem against the surface in its path. This action will cause the stem to be removed from the cherry by lateral bending of the stem relatively to the cherry, as distinguished from a pulling action of a gripping device. In practice, the length of the stems of cherries vary, and particularly when the stems are short, the machines dependent upon gripping devices for the removal of stems, have been found to be inefficient. By providing a method which will move the cherry so that a rotary movement will cause the stems to be whipped from the cherry, the uncertainty of the gripping devices is overcome.

Furthermore, by providing apparatus in which the removal of the stems is effected without gripping devices, a much greater capacity, as well as efficiency is attained, because of the continuity and higher speed of operation possible.

The invention further designs to utilize fluid under pressure, such as air, for propelling or forcing fresh fruit through a runway during the stemming operation and a resultant advantage of that practice is that any material pressure upon the fruit likely to mar or deteriorate it is entirely avoided.

The invention consists in the improved apparatus hereinafter set forth and more particularly defined by claims at the conclusion hereof.

The drawing is a view, partly in elevation and partly in section, of an apparatus embodying the invention and for practising the improved method.

The improved apparatus comprises mainly, a runway for the fruit formed by a helically extending pipe 5, the upper end of which terminates in or is connected to the bottom of a hopper 6, which directs the fruit into the said runway. The pipe is in the form of a conoidal helix, the coils being of gradually enlarged diameter and the lower end of the coil terminates in a discharge outlet 7. The hopper 6 exemplifies means for directing the fruit into the coil 5. A pipe 8 terminates in a jet-nozzle 9 adjacent the point where the fruit passes into the coils 5 from the hopper 6, and this pipe is connected to a suitable source of fluid under pressure, such as compressed air. The jet 9 is formed and disposed to direct the fluid against the fruit dropping into the inlet of the runway-pipe to force the fruit through said pipe. If desired, a small opening 10 may be formed in the nozzle 9 to direct a small jet of air upwardly so that the fruit will not pack at the inlet to the coil, and if desired, also an additional jet 11 may be connected to the pipe 5 intermediate its ends to force the fruit through the lower coils of the runway-pipe if the character of the fruit should make it desirable. Jet 11 may be connected by a pipe 12 to air-supply pipe 8 and directs the fluid tangentially into the runway. A valve 14 controls the operation of jet 11.

As the fruit is forced by gravity from the hopper 6 to the inlet of the coil 5, the blast of air from jet 9 forces it to roll around through the runway pipe 5. This causes the fruit to roll through the runway and in doing so, the stem will sooner or later strike the bottom or sides of the pipe forming the runway and be whipped or struck or flexed, so that it will be loosened from the cherry and separated therefrom. In this rolling, centrifugal force of the stem aids flexing in separating the stems from the fruit. The air current will force the fruit and the stems through the coil until they are discharged through the outlet 7. If the condition of the fruit is such as to require additional force to carry it entirely through the coil, valve 14 may be opened to further supply an additional blast of air.

The coils of the helical runway are of varying or gradually increasing diameter. The purpose of this formation is to cause the axis of rotation of the fruit to be varied by the pipe itself as the cherries are rolling therethrough, this insuring flexure of the stems while the fruit is passing through the pipe, and also to cause the fruit to separate in transit, and thus avoid any tendency to clog. In practice, I have found that the pressure of the air should be sufficient to force the cherries through at such a speed that the stems will be whipped from the fruit, but that excessive pressure should be avoided to obviate marring of the fruit. It has also been found that the diameter of the runway should be such that excessive whipping action should not be caused. A helical pipe, having coils approximately about ten or twelve inches in diameter operated by air under suitable pressure has been found to give very satisfactory results.

The invention thus exemplifies an improved method of removing the stems from cherries or similar fruit in which the separation is effected by causing the fruit to roll, so that its stems will come in contact with the runway and be removed by striking the stems against a stationary surface; also one, in which fluid under pressure is used to separate the stems from the fruit; also one, in which the use of grippers, either for the stem or cherry are avoided; and also an exceedingly efficient apparatus of great capacity for separating the stems from the fruit.

The invention is not to be understood as restricted to the precise practice or apparatus set forth, since these may be modified within the scope of the appended claims, without departing from the spirit and scope of the invention.

Having thus described the invention, what I claim as new and desire to secure by Letters Patent, is:

1. Apparatus for stemming fruit comprising a runway having a substantially smooth surface on which the fruit is free to roll and which, when struck by the stems of the fruit will sever them, the runway being formed so the fruit will roll without being crushed, and fluid means under pressure for propelling the fruit through the runway.

2. Apparatus for stemming fruit, comprising a helical runway having a substantially smooth surface on which the fruit is free to roll and which, when struck by the stems of the fruit will sever them, the runway being formed so the fruit will roll without being crushed, and fluid means under pressure for propelling the fruit through the runway.

3. Apparatus for stemming fruit, comprising a runway having a substantially smooth surface on which the fruit is free to roll and which, when struck by the stems of the fruit will sever them, the runway being formed so the fruit will roll without being crushed, and a pneumatic jet for propelling the fruit through the runway.

JOHN B. FOOTE.

Witnesses:
MILDRED STUMPF,
KATHARINE GERLACH.